United States Patent
Wegner et al.

(10) Patent No.: US 11,860,025 B2
(45) Date of Patent: Jan. 2, 2024

(54) SYSTEM FOR RECOGNIZING AND/OR DETERMINING THE VOLUME OF BODIES OR SUBSTANCES MADE OF DIELECTRIC AND/OR CONDUCTIVE MATERIAL

(71) Applicant: RECHNER Industrie-Elektronik GmbH, Lampertheim (DE)

(72) Inventors: Tim Wegner, Ilmenau (DE); Stefan Gebhardt, Lampertheim (DE); Armin Kohler, Lampertheim (DE); Eduard Bischler, Lampertheim (DE)

(73) Assignee: RECHNER Industrie-Elektronik GmbH, Lampertheim (DE)

( * ) Notice: Subject to any disclaimer, the term of this patent is extended or adjusted under 35 U.S.C. 154(b) by 190 days.

(21) Appl. No.: 17/316,347

(22) Filed: May 10, 2021

(65) Prior Publication Data

US 2021/0356312 A1    Nov. 18, 2021

(30) Foreign Application Priority Data

May 12, 2020  (EP) ..................................... 20174239

(51) Int. Cl.
*G01F 17/00* (2006.01)
*G01F 23/284* (2006.01)

(52) U.S. Cl.
CPC .................. *G01F 23/284* (2013.01)

(58) Field of Classification Search
CPC .... G01F 23/284; G01S 13/0209; G01S 13/88; H01Q 1/225; H01Q 1/40
See application file for complete search history.

(56) References Cited

U.S. PATENT DOCUMENTS 6,249,244 B1 * 6/2001 Heidecke ............... G01F 23/284
367/908
6,606,904 B2 * 8/2003 Muller .................. G01F 23/284
343/703

(Continued)

FOREIGN PATENT DOCUMENTS

DE     10049995 A1    4/2002
DE     10149851 A1    4/2003

(Continued)

OTHER PUBLICATIONS

M. Jalilvand et al., "Broadband miniaturised bow-tie antenna for 3D microwave tomography", "Electronics Letters", Feb. 13, 2014, vol. 50, No. 4, pp. 244-246, doi: 10.1049/el.2013.3974.

(Continued)

*Primary Examiner* — Dominic E Hawkins
(74) *Attorney, Agent, or Firm* — Kaplan Breyer Schwarz, LLP (57) ABSTRACT

A system for recognition and/or determination of the volume of bodies or substances made of dielectric and/or conductive material within an interior of a measuring cell in the form of a container, with a conductive and/or non-conductive measuring cell wall that has a surface directed into the interior, includes an ultra broadband microwave unit, and at least one ultra-broadband antenna having at least one disk-shaped carrier substrate which has a first surface facing a first side and a second surface which is opposed to the first surface and forms an outer side of the antenna, wherein the carrier substrate is arranged and intended to replace part of the surface of the measuring cell wall directed into the interior during operation, after fastening the ultra-broadband antenna to the measuring cell, or to extend in the interior at a distance in front of the measuring cell wall, wherein the ultra-broadband antenna includes emitter elements arranged on or in the carrier substrate is set up as an electrically short (Continued)

antenna with an at least substantially hemispherical emission characteristic to cover a volumetric measurement field.

15 Claims, 7 Drawing Sheets

(56) References Cited

U.S. PATENT DOCUMENTS

| | | | | |
|---|---|---|---|---|
| 10,247,596 | B2* | 4/2019 | Kutil | H01Q 13/24 |
| 2002/0121138 | A1* | 9/2002 | Malzahn | H01Q 11/105 |
| | | | | 73/290 R |
| 2004/0080324 | A1* | 4/2004 | Westerling | G01F 23/284 |
| | | | | 324/644 |
| 2006/0225499 | A1* | 10/2006 | Gravel | G01F 23/284 |
| | | | | 73/290 V |
| 2010/0141505 | A1* | 6/2010 | Bergmann | H01Q 13/02 |
| | | | | 342/124 |
| 2015/0346016 | A1* | 12/2015 | Klofer | G01F 23/284 |
| | | | | 342/124 |
| 2016/0274234 | A1* | 9/2016 | Nawrocki | G01S 13/26 |
| 2020/0011824 | A1* | 1/2020 | Akhavan-Tafti | G01N 27/02 |

FOREIGN PATENT DOCUMENTS

| | | |
|---|---|---|
| DE | 102006019688 B4 | 11/2007 |
| WO | 2016011530 A1 | 1/2016 |
| WO | 2017037516 A1 | 3/2017 |

OTHER PUBLICATIONS

Young-Gon Kim et al., "Design of Bow-Tie-Type UWB Antennas Using an Ultra-wideband Balun", Antennas and Propagation International Symposium, Piscataway, NJ, USA, IEEE, dated 2007, pp. 1989-1992, DOI: 10.1109/APS.2007.4395913.
Extended European Search Report issued in counterpart European patent application No. 20174239.2, dated Nov. 16, 2020, 15 pp. w/ English translation.
O. Zinke et al., "Lehrbuch der Hochfrequenztechnik" [Textbook of High Frequency Technology], Springer-Verlag, dated 1973, ISBN 3-540-05974-1, p. 261, chapter 6.2.2, first volume, second edition.
Office Action issued in Canadian Patent Application No. 3116798 dated Jan. 13, 2023.
Office Action Communication dated Nov. 30, 2022 in EP Patent Application No. 20174239.2 and English translation thereof.
Reimar Koenig, On the Limitation of Claim Content By "Cash" Derivatives, Jan. 1, 1997, Communications of the German Patent Agency, Heymann, Coln, DE, p. 62.

* cited by examiner

SYSTEM FOR RECOGNIZING AND/OR DETERMINING THE VOLUME OF BODIES OR SUBSTANCES MADE OF DIELECTRIC AND/OR CONDUCTIVE MATERIAL

RELATED APPLICATION

This application claims priority to and the benefit of European Application No. 20 174 239. 2 filed May 12, 2020, the disclosure of which is incorporated herein by reference in its entirety.

FIELD

The invention relates to a system for recognizing and/or determining the volume of bodies or substances made of dielectric and/or conductive material within an interior of a measuring cell, in particular in the form of a container, with a conductive and/or non-conductive measuring cell wall that has a surface directed into the interior.

BACKGROUND

Particularly in the course of the trend towards intelligent factories as part of the Future Industry 4.0 project, manufacturing companies face considerable tasks. For example, greater flexibility is required, the products must be customizable, and at the same time the products and manufacturing processes are becoming more complex. Individual production also goes hand in hand with lower production quantities from batch size 1, which make more flexible production systems necessary. In order to achieve a consistently high production quality even with small consumption quantities and dynamic processes, all relevant control variables must be permanently available. This also includes the filling quantities and material distributions of liquids, viscous substances and free-flowing bulk goods in an increasing number of small storage and process containers that have to be continuously detected by sensors.

For example, sensors will also be required in the future that provide information on volumetric filling material distribution in a contactless manner and/or are suitable for filling level measurements through material layers.

Nowadays, filling level measurements are carried out using a wide variety of measurement methods, wherein a basic distinction is made between limit level measurement and continuous measurement. For limit level measurements, a plurality of sensors are usually installed at defined height positions in the container wall or vertically from above, so that they usually only serve to avoid overfilling or running empty.

Continuous filling level measurements, on the other hand, provide much more specific information and are advantageous, for example, when a plurality of limit levels above the filling level are to be generated. In the case of continuous filling level sensors, a distinction is made between sensors that come into contact with the product and those that measure contactlessly. In all types of sensors that come into contact with the product, the measuring electrodes extend over a defined filling level in the container and are always in contact with the filling material, i.e. they must meet the environmental conditions in the container. Complicated container geometries, such as corners, bevels, changes in diameter, or built-in components such as filling/heating devices and/or agitators, atmospheric disturbances and chemical and physical properties of the medium, such as viscosity, steam, foam, reactivity, change in density, can impair the measurement or even make it impossible.

Ideally, each measurement should therefore take place from the outside, at least without contact with the filling material. Contactless measuring sensors work, for example, on the basis of ultrasound, microwaves, radiometry or radar. With pulse radar, for example, short impulses are sent from above into the container and when these hit the boundary surface of the medium, part of the energy is reflected and can be detected as an echo. The distance to the sensor is then determined from the transit time of the captured signal and the filling level is ultimately calculated using the specified container height. Traditionally, radar systems with a beam that is as narrow as possible are used to capture only reflections from the filling material surface. In this way, however, strongly focusing antennas are usually used, which, however, only lead to practical sizes at high frequencies and can then only detect a small area of the surface, which can lead to considerable differences between the measured value and the actual filling quantity if there are conical heaps of material. Due to the usually narrow beams or small opening angles of today's radar sensors, conical heaps of material are usually not detected outside the beam and can consequently lead to a considerable difference between the measured filling level and the actual filling quantity. These sensors also have a dead area, in particular in the field area close to the antenna, in which the measurement accuracy decreases significantly and the existing container volume can therefore only be used incompletely.

DE 10 2006 019 688 B4 describes, for example, a planar antenna for filling level radar for filling level detection by sensors, wherein a glass or ceramic disk is provided on the rear side, i.e. on the side facing away from the filling level area to be detected by sensors, at least one planar emitter element is applied and spaced therefrom, also on the side facing away from the filling level area to be detected by sensors, a metal wall is also provided as a ground surface for the emitter element. The planar antenna structure applied by the at least one emitter element is made of a conductive material and can be a single patch radiator or an array of a plurality of individual patches. In this way, an electromagnetic high-frequency transmission signal with a wavelength k is generated and emitted through the disk to the filling material, which has a thickness of a multiple of λ/2 in order to minimize the interference. Moreover, to maximize the bandwidth of the antenna, a gas, e.g. air, or a vacuum with a low dielectric constant can be located between the ground surface and the antenna structure. Furthermore, according to DE 10 2006 019 688 B4, it is provided that such a planar antenna, which is additionally designed with process separation, is again used in particular within a horn antenna or for installation in a waveguide.

Apart from the contactless measurement proposed in DE 10 2006 019 688 B4, in which at least all of the electronic components of the sensors are located outside the filling level area to be detected by sensors, a wider beam would be significantly more advantageous, in particular for filling material detection or object detection in more complex container structures.

SUMMARY

One object of the invention is therefore to improve contactless measurement within a measuring cell in such a way that even geometrically complex measuring cell volumes can be detected substantially completely and thus in particular without dead areas in relation to bodies or substances with a cost-effective structure.

The object of the invention is achieved by a system having the features according to claim 1. Advantageous developments are the subject of the dependent claims.

Thus, according to the invention, for recognizing and/or determining the volume of bodies or substances made of dielectric and/or conductive material within an interior of a measuring cell, in particular in the form of a container, with a conductive and/or non-conductive measuring cell wall which has a surface directed into the interior, a system is provided which is arranged as follows.

It comprises an ultra-broadband microwave unit and at least one ultra-broadband antenna with at least one disk-shaped carrier substrate which has a first surface facing a first side and a second surface which is opposed to the first surface and forms an outer side of the antenna. In other words, the first surface directed towards the first side is expediently located on the side facing away from the filling level area to be detected by sensors. The carrier substrate is also arranged and intended to replace part of the surface of the measuring cell wall directed into the interior during operation, i.e., in particular after fastening the ultra-broadband antenna to the measuring cell, or to extend in the interior at a distance in front of the measuring cell wall. The system according to the invention is further characterized in that the ultra-broadband antenna with emitter elements arranged on or in the carrier substrate is set up as an electrically short antenna with an at least substantially hemispherical emission characteristic to cover a volumetric measurement field.

It is therefore advantageous that the ultra-broadband signals that can be used through the use of the ultra-broadband microwave unit and antenna, i.e. with a large bandwidth and at the same time low center frequencies, particularly in the single-digit GHz range, can penetrate a wide variety of materials, which on the one hand supports a volumetric measurement and on the other hand minimizes the technical requirements of the electronics required for this. The measurement signals obtained in this way can then be processed and, in particular, evaluated by downstream digital algorithms depending on the application. In other words, due to the signal evaluation shifted away from ultra-broadband electronics to digital algorithms, measurements with the system according to the invention can be carried out extremely precisely down to the floor and into the most varied areas including corners of a measuring cell, i.e. in particular to the container floor and into the corners of a container, in particular taking account of transit time and signal shape analyses, in particular also in the presence of multiple reflections of the measurement field.

Furthermore, since the carrier substrate of the ultra-broadband antenna replaces part of the surface of the measuring cell wall directed into the interior space or extends in the interior space at a distance from the measuring cell wall, and the emitter elements arranged thereon or therein have an at least substantially hemispherical emission characteristic, dead areas can be substantially completely avoided and the system can therefore also be used for measurements in the vicinity of the antenna.

It has also been shown that particularly useful emission characteristics can be set up if the system has two planar emitter elements arranged on or in the carrier substrate, which are held in a common plane, extending substantially parallel to the carrier substrate and together form a surface dipole. It is advantageous that the emitter elements can basically be of any shape in order to form a large number of possible antenna structures, such as, for example, circular, elliptical and ring structures or also butterfly structures, fly structures, i.e. "bow tie" structures, and so-called batwing structures. A coaxial conductor connection, to which the ultra-broadband microwave unit is also connected, is then expediently connected to these emitter elements, specifically for the wired transmission of an ultra-broadband signal between the emitter elements and the ultra-broadband microwave unit.

In a further particularly preferred embodiment, the invention also provides that the system is set up horizontally and/or vertically parallel to the two planar emitter elements with at least two further planar emitter elements, wherein two of these at least two further planar emitter elements extending substantially parallel to the carrier substrate are held by this carrier substrate in each case in a common plane relative to each other, and together form a surface dipole.

In a preferred development, a coaxial conductor connection for the wired transmission of an ultra-broadband signal between these emitter elements and the ultra-broadband microwave unit also connected to this coaxial conductor connection is also connected to these two further emitter elements forming a surface dipole. It is advantageous that the two planar emitter elements and each of the at least two further planar emitter elements can be connected via the same coaxial conductor connection or also different coaxial conductor connections, so that a large number of individually different bistatic and monostatic antenna structures can be formed with such further surface dipoles depending on the application.

Each coaxial conductor connection is expediently connected via at least one adapter, in particular for impedance conversion, expediently comprising a balun transformer, to the emitter elements in each case forming a surface dipole.

Furthermore, in a supplementary and/or alternative embodiment, it is provided that the ultra-broadband antenna comprises a shield arranged at a distance from the carrier substrate and towards the first side, i.e. in particular on the side facing away from the filling level area to be detected by sensors, when viewed from the carrier substrate. Wave propagation of the ultra-broadband signal in this direction can thus be avoided in a simple manner and the field propagation behind the antenna can be minimized.

It is provided in particular that the shield is not connected to the ultra-broadband microwave unit and/or that the shield is formed directly by a metal measuring cell wall or by a cover of the ultra-broadband antenna.

When using an adapter and a shield, it is further provided according to a preferred development that the adapter is arranged between the shield and the carrier substrate.

In addition to and/or as an alternative to the shield, a surface adjacent to the carrier substrate and directed towards the first side can also be arranged as a protective layer, a non-conductive layer, in particular for covering, and/or an absorber layer, in particular for electromagnetic absorption. With at least one such layer designed for covering and/or absorption, additional reflections on rear layers, in particular also grounded layers, can thus be avoided in a simple manner.

In this case, according to an expedient embodiment, the adapter is embedded in the protective layer.

It has also proven to be particularly expedient if the ultra-broadband microwave unit is set up for a continuously periodic signal as an ultra-broadband signal, an ultra-broadband M-sequence signal having been shown to be particularly expedient, i.e. in particular a pseudo-coded or pseudo-random maximum signal or noise sequence signal.

In addition, the ultra-broadband microwave unit has at least one transmission module for generating the ultra-broadband signal and, in an expedient embodiment, can also include an evaluation module for evaluating a received ultra-broadband signal.

According to a preferred embodiment, it is further provided that the system is set up with at least one further ultra-broadband antenna according to previously described features, wherein this at least one further ultra-broadband antenna is connected to at least one evaluation module for evaluating a received ultra-broadband signal.

Consequently, a plurality of ultra-broadband antennas each with at least one carrier substrate which replaces part of the surface of the measuring cell wall directed into the interior, or extends in the interior and at a distance in front of the measuring cell wall, can be used in particular for evaluating a received ultra-broadband signal at different locations within the measuring cell.

A multi-layer circuit board can also be used expediently as the carrier substrate and/or the emitter elements can be embedded in the substrate.

BRIEF DESCRIPTION OF THE DRAWINGS

Further advantages and features of the invention are apparent from the following description of some preferred embodiments with reference to the accompanying drawings. The drawings each show a sketch in a greatly simplified, not to scale representation.

DETAILED DESCRIPTION

Figure 11:
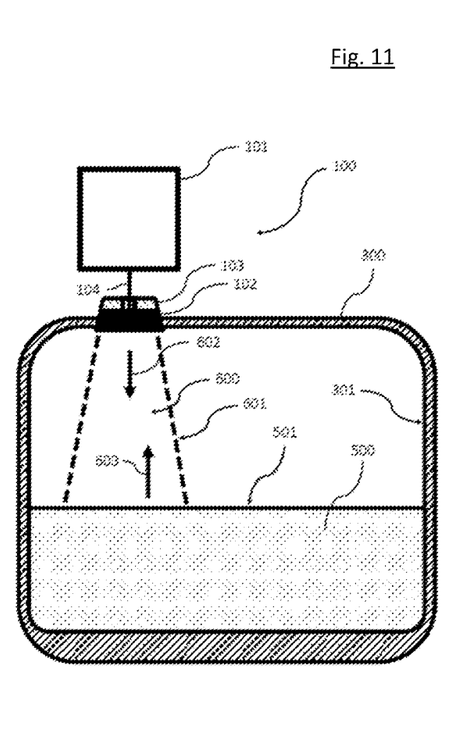
FIG. 11 is a cross-section through a measuring system according to the prior art with focusing high-frequency antennas for filling level detection in a container.
Figure 12:
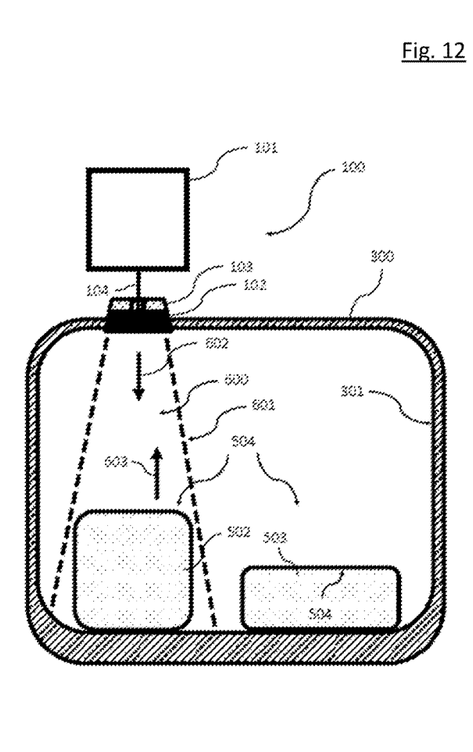
FIG. 12 is a cross section through the measuring system according to the prior art with focusing high-frequency antennas for object detection in a container.
Figure 13:
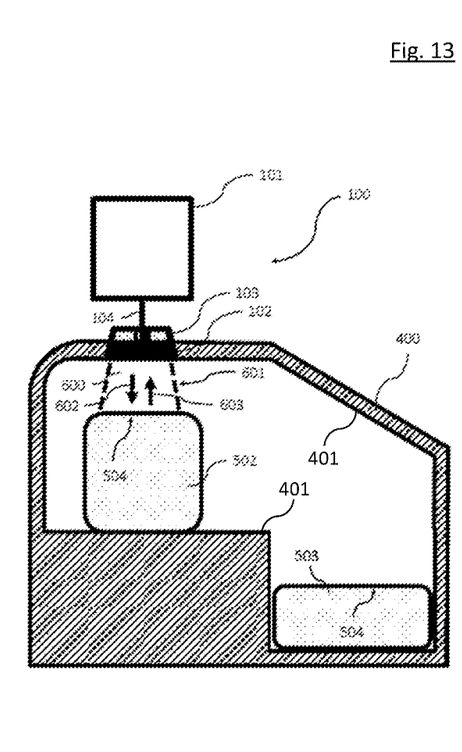
FIG. 13 is a cross-section through the measuring system according to the prior art with focusing high-frequency antennas for object detection in another container.

In the following, for a further description of some preferred embodiments of the invention, reference is made to the figures, in which for improved comparison of the systems according to the invention first of all the systems illustrated in FIG. 11 to 13 are described, which show measuring systems according to the prior art with focusing high-frequency antennas for filling level detection and object detection in different containers.

In particular, the systems shown in cross section in FIG. 11 to 13 each have a filling level radar 100 with antennas (or an antenna) 102 that focus high-frequency beams. The respective antenna structure of the focusing antenna 102 can be made of a conductive material (not shown in greater detail) and in particular can be made up of a single patch radiator or an array of a plurality of individual patches, as described, for example, in DE 10 2006 019 688 B4. The focusing antennas 102 are each electrically conductively connected to a ground surface or reflector layer 103 arranged on a rear side, i.e. on the side facing away from the filling level area to be detected by sensors, wherein a high-frequency connection 104 leads from the focusing antenna 102 to microwave electronics 101. According to FIGS. 11 and 12 each show a "cuboid" or also "cylindrical" container 300 with a container wall 301 by which a measuring cell is defined. That is to say, the container wall 301 forms the measuring cell wall, so that the surface of the container wall 301 directed into the interior ultimately defines the filling level area to be detected by sensors. Such a filling level area is consequently substantially "hollow cuboid" or also "hollow cylindrical." As a modification of FIGS. 11 and 12, FIG. 13 does not show a merely "cuboid" or also "cylindrical" container, but a container 400 with a substantially arbitrary structure, in particular an arbitrarily complex structure, which consequently also comprises a container wall 401 following this arbitrary structure. A measuring cell defined in this way is defined and thus also the filling level area, which is defined by the surface of the container wall 401 directed into the interior and is to be detected by sensors, is consequently not merely "hollow cuboid" or also "hollow cylindrical," but can include shoulders, corners, bevels and the like.

A measurement field 600 generated in each case by means of the focusing antenna 102 is also sketched in FIG. 11 to 13. As can be seen, the generated measurement field 600 is a focused measurement field and consequently has in particular a correspondingly focused directional beam 601, which delimits the area in which a transmission signal 602 with a certain minimum field strength can be generated or a reception signal 603 with a certain minimum signal strength can be received.

If, for example, a liquid or a bulk material is located in the container 300 according to FIG. 11 as the filling material 500, so that the filling level area and thus the interior of the measuring cell is substantially homogeneously filled with the liquid or the bulk material from the floor upwards, consequently a filling level detection can also be carried out substantially satisfactorily via the respective filling material surface 501 by the measuring system according to the prior art which is shown in FIG. 11, since in such a case of homogeneous filling material distribution a focused directional beam 601 generally has no negative effects on the measurement result.

However, if a plurality of bodies or substances such as those designated by 502 and 503 as filling material which do not homogeneously fill the filling level area and thus the interior of the measuring cell upwards from the floor, or are arranged spaced apart from one another in the interior of the measuring cell, are in the container 300 according to FIGS. 12 and 13, consequently the focused directional beam 601 can lead to only some of the bodies or substances or only individual bodies or substances within the area of the directional beam—in FIGS. 12 and 13, for example, only the body designated by 502—being detected by sensors, i.e. recognized. However, a filling level measurement based on a recognized body, or according to FIGS. 12 and 13, a volume determination, can also already lead to different results in these embodiments. If, as can be seen in FIG. 12, the body 502 lies on the floor of the "cuboid" or "cylindrical" container shown there and the measurement field 600 extends within the directional beam 601 around the body 502 down to the container floor, then by means of the body surface 504 of the body 502 detected by sensors, in addition to the mere recognition of the body, a volume determination of the body can generally also be carried out using appropriate electronics. On the other hand, if the body is in the near field area of the antenna, for example the body 502 in FIG. 13, consequently only part of the body 502 is detected by the measuring system according to the prior art which is shown in FIG. 13. Consequently, in principle the body 502 can be recognized by means of the body surface 504 of the body 502 detected by sensors, but the volume of the body can generally no longer be determined. In addition, a negative effect results if the body, such as the body 502 in FIG. 13, does not lie on the floor of a merely "cuboid" or also "cylindrical" container, but rather, for example, on a shoulder or on other distributed bodies located individually under the body. The body surface 504 of the body 502 detected by sensors can in fact reflect an incorrect filling level in such a case. Meanwhile, the body 503 located outside the directional beam 601 in FIGS. 12 and 13 cannot be detected at all, in particular since its body surface 504 is also no longer detected by sensors by means of the measurement field 600.

Figure 1:
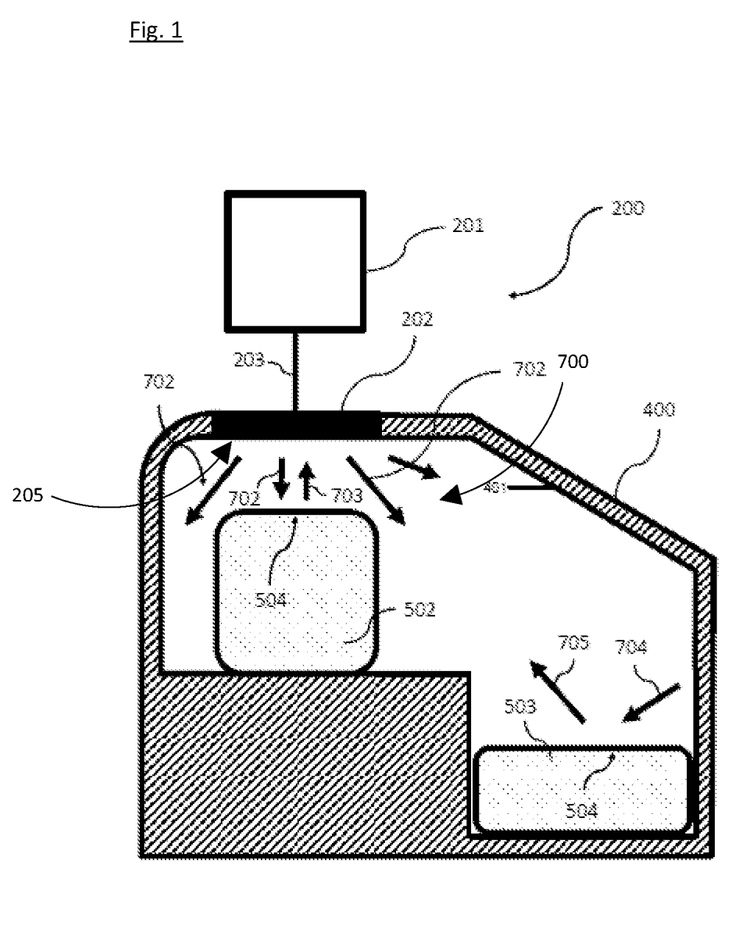
FIG. 1 shows a first embodiment of a system according to the invention for recognizing and/or determining the volume of bodies or substances in any structured container as an example of a possible measuring cell.
Figure 2:
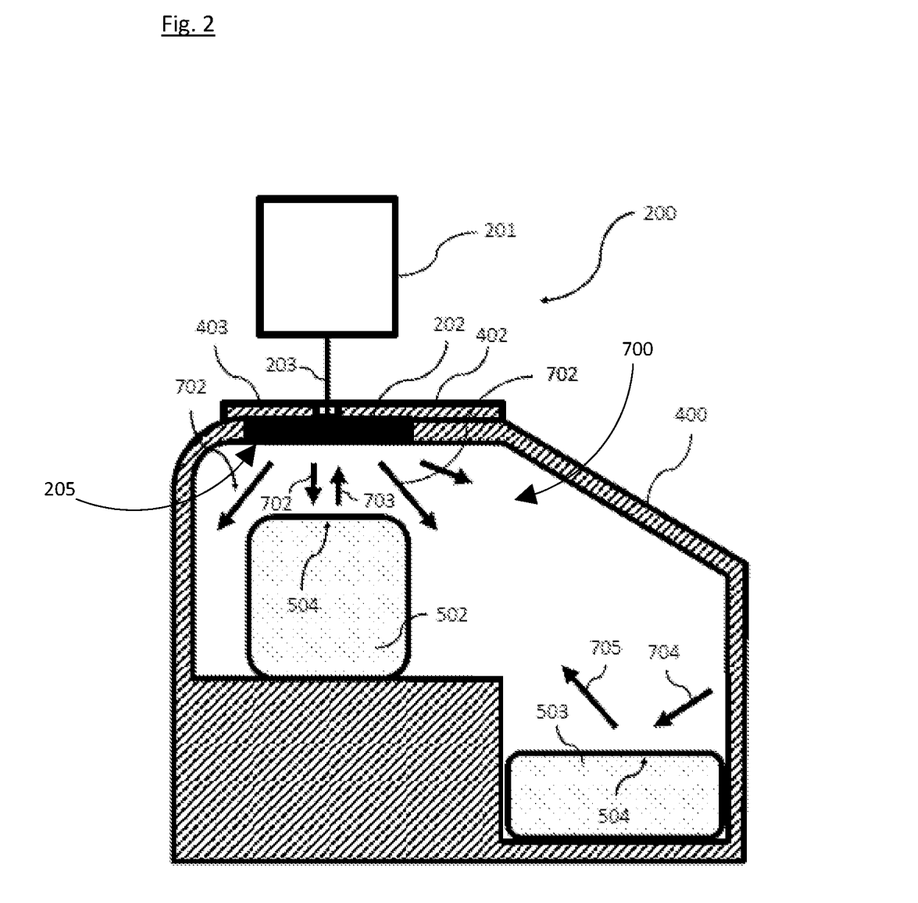
FIG. 2 shows a second embodiment of a system according to the invention for recognizing and/or determining the volume of bodies or substances in any structured container as an example of a possible measuring cell.
Figure 3:
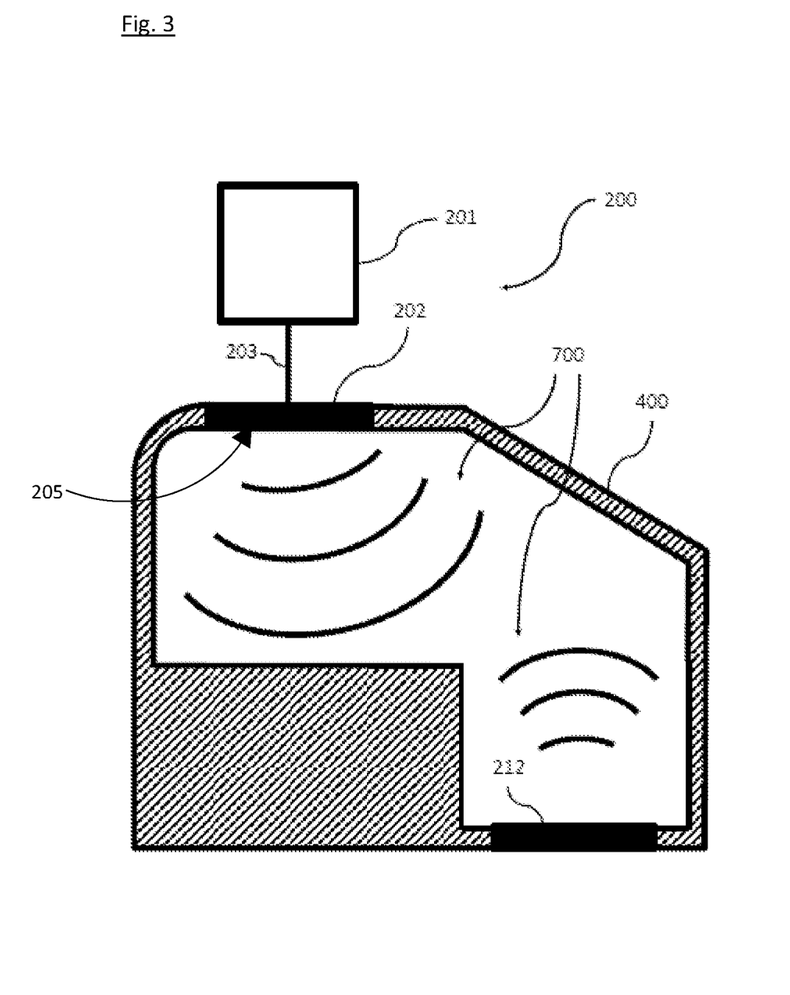
FIG. 3 shows a third embodiment of a system according to the invention for recognizing and/or determining the volume of bodies or substances in an arbitrarily structured container as an example of a possible measuring cell.

In contrast to this, FIG. 1 to 3 show, in a greatly simplified representation, various measuring systems according to the invention. In particular, three different embodiments of a system 200 according to the invention for recognizing and/or determining the volume of bodies or substances in an arbitrarily structured container are shown as examples of a possible measuring cell 400.

As can be seen below, such a system 200 according to the invention is suitable for recognizing and/or determining the volume of bodies or substances made of dielectric and/or conductive material 500, 502, 503, 504 within an interior of the measuring cell 400, and thus in particular in the form of a container, with a conductive and/or non-conductive measuring cell wall 401 which has a surface directed into the interior. Thus, also in the present embodiments, the container wall forms the measuring cell wall 401, so that the surface of the container wall directed into the interior ultimately defines the filling level area to be detected by sensors. Consequently, such a measuring cell or a similar measuring cell, and thus also the filling level area to be detected in the interior of the measuring cell by sensors, is not merely designed as a "hollow cuboid" or "hollow cylinder," but can include shoulders, corners, bevels and the like, as can also be seen in FIG. 1 to 3.

In this case the system according to the invention has an ultra-broadband microwave unit 201 and at least one ultra-broadband antenna 202. In a practical embodiment, this is connected to the ultra-broadband microwave unit 201. A component of the ultra-broadband antenna 202 is at least one disk-shaped carrier substrate with a first surface directed towards a first side and a second surface directed towards an opposing first surface. This second surface forms an outside of the antenna and the carrier substrate 205 is arranged and provided in such a way during operation, that is to say in particular after fastening of the ultra-broadband antenna to the measuring cell, as indicated for example in FIG. 1 to 3, to replace part of the surface of the measuring cell wall directed into the interior. Alternatively, however, the carrier substrate can also extend within the interior at a distance in front of the measuring cell wall. As can be seen, for example, from FIG. 4 to 10, emitter elements 206a, 206b, 207a, 207b are arranged on or in the carrier substrate 205 in such a way that they are set up as an electrically short antenna with an at least substantially hemispherical emission characteristic, in order to cover a volumetric measurement field 700, as can be seen in FIG. 1 to 3 by way of example.

As is known, an antenna is called an electrically short antenna if the electrical conductor of the antenna is much smaller than half the operating wavelength k: In the present case, i.e. when using an ultra-broadband microwave unit and antenna and the ultra-broadband signals that can be used with it, i.e. for signals in particular within a frequency range between 0.1 and 6 GHz, the wavelengths range approximately between 30 dm and 5 cm during operation. Depending on the desired application, half an operating wavelength therefore preferably ranges between 15 dm and 2.5 cm and the electrical conductor or the conductor structure of the emitter elements making up the antenna must be adapted accordingly as far as possible. In particular, according to the definition from "*Lehrbuch der Hochfrequenztechnik*" [Textbook of High Frequency Technology], first volume, second edition, page 261, chapter 6.2.2, from 1973, ISBN 3-540-05974-1, relating to the establishment of an electrically short antenna, it is provided that the electrical conductor or the conductor structure of the emitter elements is less than or equal to $\lambda/8$.

As already explained, ultra-broadband signals with low frequencies are provided in order to be able to penetrate a wide variety of dielectric materials particularly well. In addition, correspondingly small antennas with emitter elements in the centimeter range are required and provided for small measuring cells. When the entire usable frequency range is considered, these antennas are by definition electrically short antennas that have little or no directional effect and thus expediently support a volumetric field propagation or measurement.

In other words, the emitter elements 206a, 206b, 207a, 207b arranged on or in the carrier substrate 205 are set up to cover a volumetric measurement field 700 over a solid angle of at least $2\pi$.

In this way, in the subject matter of the prior art described above, with a system according to the invention, even in geometrically complex measuring cells and thus geometrically complex filling level areas to be detected by sensors, dead areas can be substantially completely avoided and thus the system can also be used for measurements, in particular radar measurements, for recognizing and/or determining the volume of bodies or substances in the vicinity of the antenna.

In particular, if the carrier substrate extends at a distance in front of the measuring cell wall in the interior during operation, emission characteristics have also been shown to be particularly preferred with which a volumetric measurement field 700 can be covered over a solid angle of far more than 2π up to 4π and thus the emission characteristic extends up to a fully spherical emission characteristic.

Also in the measuring system 200 according to the invention, a high-frequency connection 203 expediently leads from the ultra-broadband antenna 202 to the ultra-broadband microwave unit 201, for the wired transmission of an ultra-broadband signal to the ultra-broadband microwave unit 201, i.e. in particular a coaxial connection connected to the emitter elements for the wired transmission of the ultra-broadband signal between the radiating elements and the ultra-broadband microwave unit 201.

Consequently in a measuring cell 400 with shoulders, corners, bevels and the like, for example in the container according to FIG. 1 or 2, which has a similar, i.e. arbitrarily complex structure to the container according to FIG. 13, if there are substances such as those designated by 502 and 503 which do not fill the filling level area and thus the interior of the measuring cell homogeneously upwards from the floor or are arranged spaced apart from one another inside the measuring cell, then due to the covering of the volumetric measurement field 700 over a solid angle of at least 2π, based on the body surfaces 504 of both the body 502 and also the body 503 detected by sensors, the multiple bodies or substances are recognized and/or their respective volumes are determined, in particular depending on the application-specific further configuration of digital algorithms used for signal evaluation. As outlined in the figures, with the help of the at least substantially hemispherical emission characteristic of the ultra-broadband antenna according to the invention, dead areas are thus substantially completely avoided and the system 200 can thus also be used for measurements in the vicinity of the antenna.

Therefore, the ultra-broadband microwave unit expediently has a transmission module (not shown in detail in the figures for the sake of clarity) in order to generate the ultra-broadband signal used for the measurement, and/or it expediently has an evaluation module (likewise not shown in the figures for the sake of clarity) in order to evaluate a received ultra-broadband signal.

Exemplary transmission signals as well as transmission signals reflected on the measuring cell wall within the volumetric measurement field 700 are shown in FIGS. 1 and 2 designated respectively by 702 and 704, and exemplary reception signals as well as reception signals reflected on the measuring cell wall are designated respectively by 703 and 705.

With the system according to the invention, measurements are carried out, in particular radar measurements down to the floor and into a wide variety of areas including corners of a measuring cell, i.e. in particular to the container floor and into the corners of a container, expediently including the use of reflected signals and taking account of transit time analyses and multiple reflections, and the measurements can be evaluated extremely precisely, in particular using digital algorithms. However, it should be noted here that the signal evaluation itself, in particular when appropriate algorithms are used, is not the subject of the invention and is consequently not discussed further.

However, it should also be pointed out that the ultra-broadband antenna 202 does not necessarily have to be designed as a transmitting and receiving antenna. Thus, within the scope of the invention, it is also provided in particular that the system is set up with at least one further ultra-broadband antenna, so that a first one of the antennas is set up as a transmitting antenna and one or more further antenna(s) are set up as receiving antennas. In this case in particular, this at least one further ultra-broadband antenna is connected to at least one evaluation module for evaluating a received ultra-broadband signal. This evaluation module is preferably the evaluation module already mentioned above with regard to the ultra-broadband microwave unit, wherein it is also possible for a plurality of evaluation modules to be connected to one another for joint signal evaluation. Alternatively, a plurality of antennas can also be set up as transmitting antennas and only one or more of the further antenna(s) can be set up as receiving antenna. Furthermore, alternatively, a plurality of antennas can also be set up as transmitting and receiving antennas or, as a further alternative, a plurality of antennas can be set up as transmitting and receiving antennas and one or more antennas can be set up as receiving antennas.

As a result, the system according to the invention can also have a plurality of ultra-broadband antennas, each with a carrier substrate which, after the individual ultra-broadband antenna is attached to another point of the measuring cell, replaces part of the surface of the measuring cell wall directed into the interior, or is located there in the interior and extended at a distance in front of the measuring cell wall. With emitter elements thus arranged at distributed locations of the measuring cell on or in the respective carrier substrate, a radar measurement with support points at different locations within the measuring cell can consequently be carried out, which substantially no longer sets any limits to the possible structural complexity of the filling level areas to be detected by sensors for the applicability of the object according to the invention. A simple example of ultra-broadband antennas fastened at distributed locations in the measuring cell can be seen in FIG. 3, in which in addition to the ultra-broadband antenna 202, similar to FIGS. 1 and 2, such a further ultra-broadband antenna 212 is used. It may be mentioned that a large number n of such, or similar, further ultra-broadband antennas 212 can also be used within the scope of the invention.

Individual preferred embodiments are described below in connection with emitter elements which are arranged on or in the carrier substrate 205 and are connected to a coaxial conductor connection as a high-frequency connection 203, as mentioned above, which is also connected to the ultra-broadband unit 201 for the wired transmission of an ultra-broadband signal between the emitter elements and the ultra-broadband microwave unit.

Figure 4:
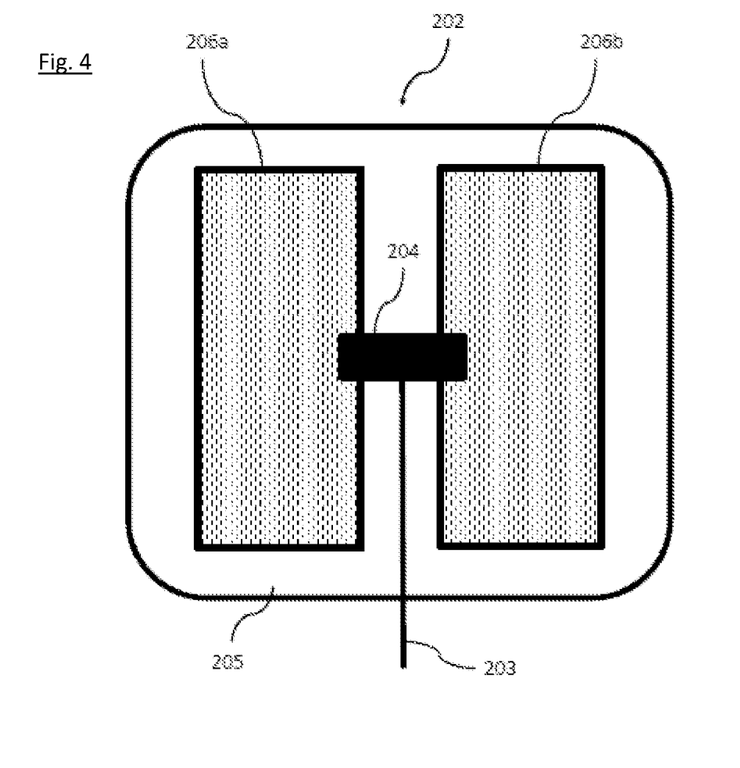
FIG. 4 is a top view of a first embodiment of a dipole antenna for use within a system according to the invention.

As shown, for example, in FIG. 4 using a first embodiment of a dipole antenna in a top view, at least two planar emitter elements 206a, 206b are expediently arranged on or in the carrier substrate 205 of the ultra-broadband antenna 202. The planar emitter elements 206a, 206b extend substantially parallel to the carrier substrate 205, are held by the carrier substrate 205 in a common plane, i.e. in particular a common planar plane spanned by the planar emitter elements and consequently extending substantially parallel to a plane spanned by the carrier substrate, and together they form a surface dipole. Due to the design of the antenna as an electrically short antenna, a correspondingly designed surface dipole is consequently not adapted to the excitation frequencies. Thus, the emitter elements expediently also extend horizontally with respect to the plane of the carrier substrate.

As also indicated in FIG. 4, the high-frequency connection 203 is expediently also connected via an adapter 204 to the emitter elements 206a, 206b that form this surface dipole. In an application-specific manner this allows in particular impedance conversions between the wired asymmetrical transmission path of the ultra-broadband signals and the associated electromagnetic signal waves of the symmetrical surface dipole as well as the transmission path of the ultra-broadband signals that is based in the interior of the measuring cell, i.e. in particular based on the medium of air or, generally speaking, a non-wired transmission path of the ultra-broadband signals and the associated electromagnetic signal waves, as is known per se to a person skilled in the art. For example, the wave impedance of typical coaxial cables is 50Ω and the impedance of the surface dipole differs significantly depending on the frequency. An adapter 204, in a preferred embodiment including a broadband balun transformer for example, is therefore generally useful to make appropriate adaptations to the wave impedance of the line at the transition between the wired electromagnetic signal waves and the surface dipole.

Consequently, the ultra-broadband antenna 202 according to FIG. 4 can be designed as a transmitting and receiving antenna, in particular in a monostatic manner. In this case, the ultra-broadband antenna 202 and thus, according to the present example, the two emitter elements 206a, 206b, are expediently connected to a transmission module comprised by the ultra-broadband microwave unit for generating an ultra-broadband signal used for the measurement and, at the same time, to an evaluation module for evaluating a received ultra-broadband signal which, however, is not shown in greater detail for reasons of clarity.

Figure 5:
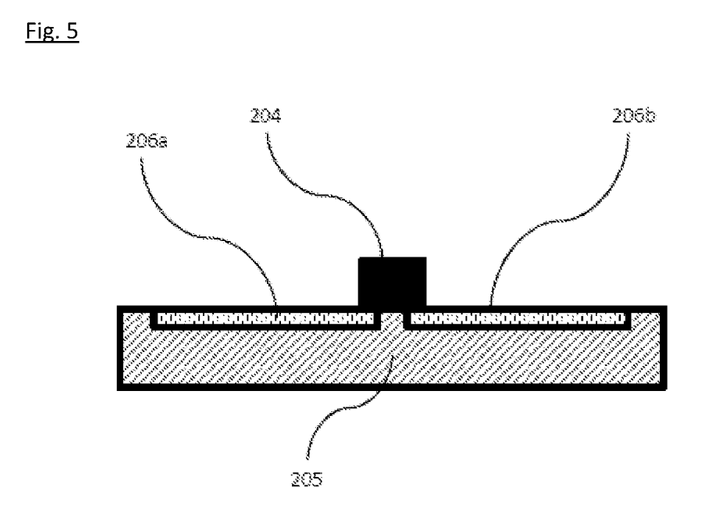
FIG. 5 is a cross-sectional view of a second embodiment of a dipole antenna with embedded emitter elements for use within a system according to the invention.

As an alternative or in addition to this, FIG. 5 shows, in a cross-sectional view, an embodiment of a dipole antenna with emitter elements 206a, 206b embedded in the carrier substrate 205 for use within a system according to the invention.

Figure 6:
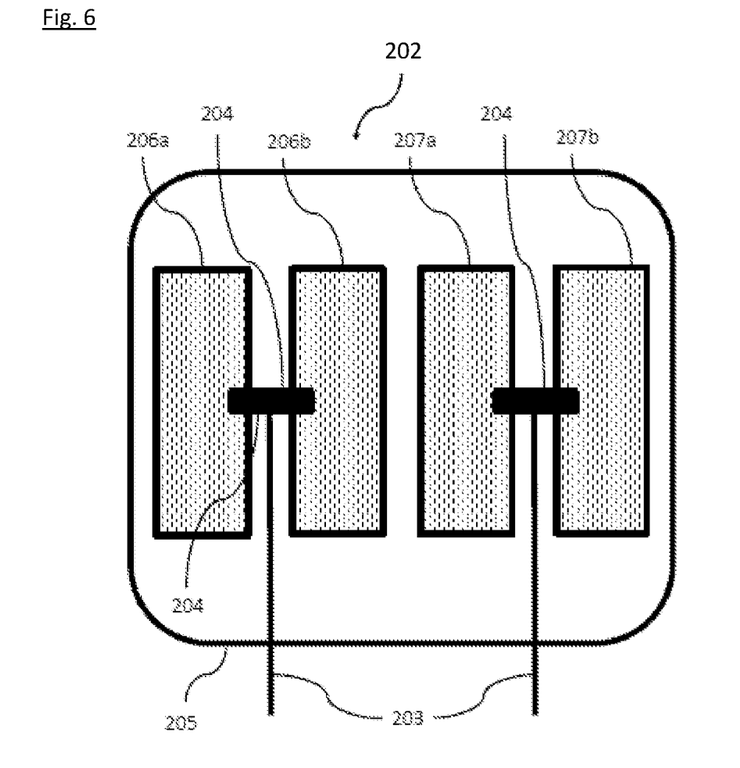
FIG. 6 is a top view of a third embodiment of a dipole antenna, in particular for bistatic measurements for use within a system according to the invention.

As a modification of FIGS. 4 and 5, FIG. 6 shows a top view of an embodiment of a dipole antenna, in particular for bistatic measurements for use within a system according to the invention. In addition to the two planar emitter elements 206a, 206b, and in fact horizontally parallel to these two planar emitter elements 206a, 206b, at least two further planar emitter elements, in the illustrated example two further planar emitter elements 207a, 207b, are included in the ultra-broadband antenna 202. In each case two 207a, 207b of such at least two further planar emitter elements are held substantially parallel to the carrier substrate 205, extending therefrom in a common plane with respect to each other and also together form a surface dipole. As can be seen in the illustrated example, a high-frequency connection 203, which is designed in particular as a coaxial conductor connection for the wired transmission of an ultra-broadband signal between the emitter elements 207a, 207b, and the ultra-broadband microwave unit (not shown), which is consequently also expediently connected to this high-frequency connection, are connected to the respective two emitter elements forming a surface dipole. Since, in the example shown, a separate high-frequency connection 203 is connected to the emitter elements 206a, 206b and to the emitter elements 207a, 207b, again in an expedient embodiment in each case via a separate adapter 204, in this case the ultra-broadband antenna 202 can in particular also be set up for bistatic measurement, i.e. two of the emitter elements forming a surface dipole, e.g. emitter elements 206a, 206b, are set up to transmit an ultra-broadband signal used for the measurement and thus expediently connected to at least one transmission module for generating the ultra-broadband signal used for the measurement and two other emitter elements forming a surface dipole, e.g. the emitter elements 207a, 206b, are set up to receive the ultra-broadband signal used for the measurement and thus expediently connected to at least one evaluation module for evaluating the received ultra-broadband signal. As can also be seen, the emitter elements each forming a common surface dipole can share a common carrier substrate, i.e. they are arranged on or in the same carrier substrate 205. Alternatively, however, the arrangement on a carrier substrate which in principle is shared would also come into consideration, i.e. the emitter elements forming a common surface dipole are each arranged on a partial carrier substrate.

Figure 7:
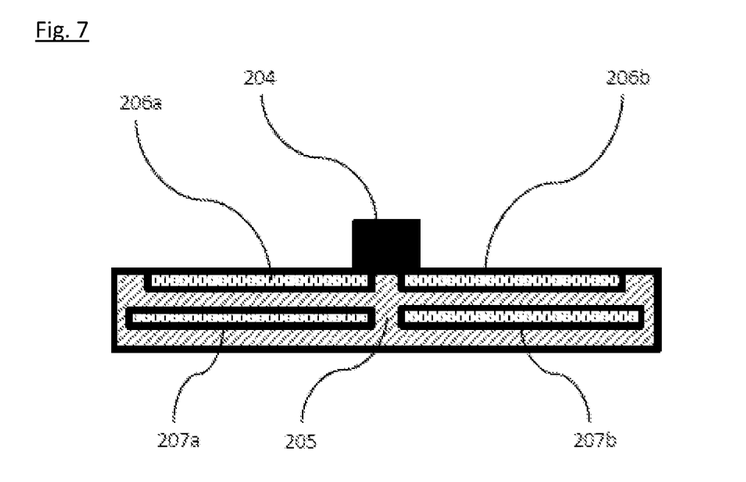
FIG. 7 is a cross-sectional view of a fourth embodiment of a dipole antenna with embedded emitter elements for use within a system according to the invention.

Similar to FIG. 5, FIG. 7 shows a cross-sectional view of a further embodiment of a dipole antenna with emitter elements embedded in the carrier substrate 205 for use within a system according to the invention. However, in a further modification to FIG. 5 and also to FIG. 6, in the embodiment according to FIG. 7, in addition to the two planar emitter elements 206a, 206b, actually vertically parallel to these two planar emitter elements 206a, 206b, at least two further planar emitter elements, in the example shown the two further planar emitter elements 207a, 207b, are comprised by the ultra-broadband antenna 202. In this case, these two further planar emitter elements are also held extending substantially parallel to the carrier substrate 205, in each case in a common plane to one another and each together basically form a surface dipole. Since in the illustrated example all four emitter elements, in each case two 207a, 207b of such at least two further planar emitter elements, are shown embedded in the carrier substrate 205, it can be seen that such a carrier substrate 205 can also be designed, for example, as a multi-layer circuit board. This also has the advantage, for example, of being able to easily produce the desired embedding of emitter elements vertically parallel to one another. A multi-layer circuit board as the carrier substrate 205 can of course also be used without embedded emitter elements.

Furthermore, in an embodiment according to FIG. 7, it can be provided according to a variant that in each case a separate high-frequency connection 203 is connected to the emitter elements 206a, 206b as well as to the emitter elements 207a, 207b, again in an expedient embodiment via a separate adapter 204, which is not shown for reasons of clarity. In an alternative variant, however, it can also be provided that the emitter elements 206a, 206b and the emitter elements 207a, 207b are connected to a common high-frequency connection 203. In this case, each of the emitter elements 206a, 206b, which together form a surface dipole, is expediently electrically connected to a different one of the emitter elements 207a, 207b which together form a further surface dipole. Thus, according to FIG. 7, in particular, the emitter element 206a is connected to the emitter element 207a and the emitter element 206b is connected to the emitter element 207b. However, this variant is also not shown for reasons of clarity.

The particular application-specific setting up of an ultra-broadband antenna 202, i.e. in particular for bistatic or monostatic measurements and as a transmitting and/or receiving antenna, is consequently extremely flexible within the scope and application of the invention. It should be pointed out that mixed forms of further planar emitter elements arranged horizontally and vertically parallel to the two planar emitter elements 206a, 206b are also within the scope of the invention. For example, these are two further planar emitter elements arranged horizontally and two vertically parallel to the two planar emitter elements 206a, 206b.

Figure 8:
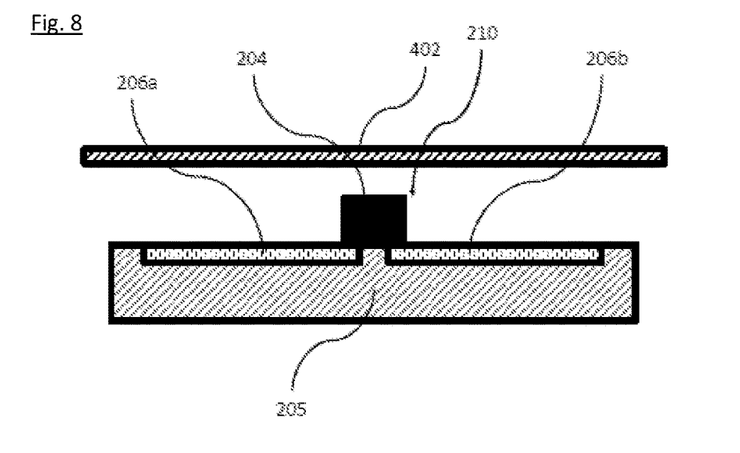
FIG. 8 is a cross-sectional view of a fifth embodiment of a dipole antenna with embedded emitter elements and rear shield for use within a system according to the invention.

FIG. 8 shows a cross-sectional view of a further embodiment of an antenna according to the invention, in the illustrated example of a dipole antenna with two emitter elements 206a, 206b embedded in the carrier substrate 205, wherein a rear shield 402 is additionally included, i.e. on the side facing away from the filling level area to be detected by sensors. It has been shown to be expedient here if such a shield 402 or a similar one is not connected to the ultra-broadband microwave unit 201. Furthermore, in a supplementary or alternative manner it has been shown to be expedient if the shield 402 is formed by the metallic measuring cell wall itself or by a metallic cover of the ultra-broadband antenna 202. Thus, a wave propagation of the ultra-broadband signal to the rear can be avoided or at least reduced in a simple manner.

As can also be seen, the shield 402, viewed from the carrier substrate, is thus arranged towards the first side and expediently at a distance from the carrier substrate 205. As shown, an adapter 204 which is used can expediently also be arranged between the shield 402 and the carrier substrate 205. In a practical embodiment, a cavity 210 is consequently also present between the shield 402 and the carrier substrate 205. Depending on the application, this cavity can, for example, also be filled with a suitable gas (e.g. air) or vacuum, in particular in order to provide further respectively desired dielectric properties to improve the radar measurement.

Figure 9:
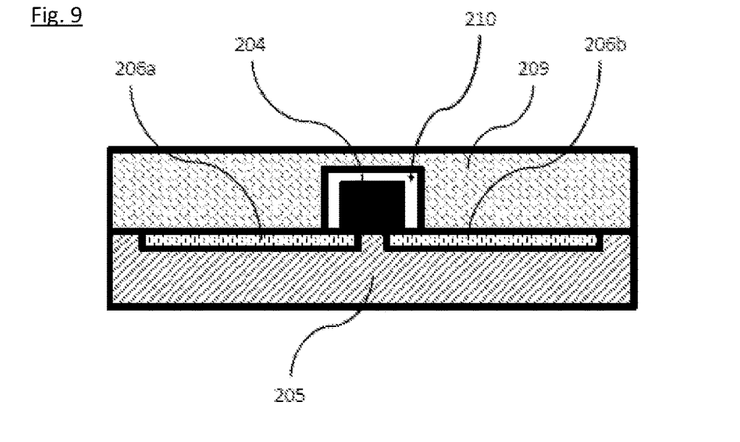
FIG. 9 is a cross-sectional view of a sixth embodiment of a dipole antenna with embedded emitter elements for use within a system according to the invention.

In the embodiment of an antenna according to the invention shown in a cross-sectional view in FIG. 9, in the illustrated example of a dipole antenna with two emitter elements 206a, 206b embedded in the carrier substrate 205, in a modification of FIG. 8 a protective layer 209, which is expediently formed by a non-conductive layer, in particular for covering, and/or by an absorber layer, is arranged adjacent to the carrier substrate 205 and is directed towards the surface. Even with at least one such protective layer designed for covering and/or absorption, additional reflections on back layers, in particular also grounded layers, can thus be avoided in a simple manner. A broadband HF material in the form of a film or a foam has also proven to be particularly expedient as such a protective layer 209. As shown, in this case an adapter 204 used within the scope of the invention can be embedded in the protective layer 209 and/or inserted within a cavity 210 formed in the protective layer 209. In the latter case, an existing free space in the cavity 210 between the adapter 204 and the protective layer 209 can also be filled with a suitable gas (e.g. air) or vacuum, for example, depending on the application.

Figure 10:
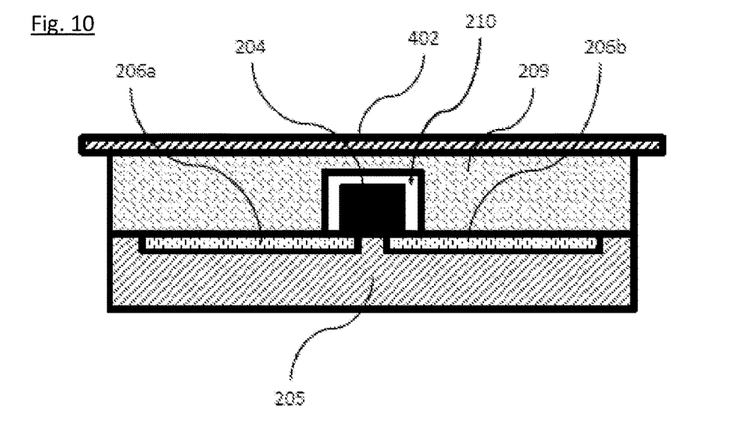
FIG. 10 is a cross-sectional view of a seventh embodiment of a dipole antenna with embedded emitter elements for use within a system according to the invention for use within a system according to the invention.

The embodiment shown in a cross-sectional view in FIG. 10 is a mixed form of the embodiments shown in FIGS. 8 and 9.

It is advantageous that the emitter elements 206a, 206b, 207a, 207b described above can be of any shape in principle. Consequently, depending on the requirement or specifically tailored to the application, a large number of possible antenna structures can be used for a particularly suitable design of a specific surface dipole made up of the emitter elements. Radiator elements have proven themselves within the scope of the invention, for example, for the formation of circular, elliptical and ring structures or also with butterfly structures, fly structures, i.e. "bow tie" structures, and so-called batwing structures.

It has also proven to be particularly useful if the ultra-broadband microwave unit is set up for a continuously periodic signal as an ultra-broadband signal, and an ultra-broadband M-sequence signal has been shown to be particularly expedient.

Taking the above description into account, it can thus be summarized that the invention creates an industry-compatible sensor system for recognizing the presence of filling materials in small and/or complex-structured measuring cells, in particular containers, in particular for recognition when empty, for filling level measurement and for determining the volume of filling materials.

Due to the contactless volumetric detection of the filling level area and the presence of the filling material in geometrically complex volumes, e.g. also within metallic or non-metallic storage and process containers, in which the filling material can assume different physical states and shapes, dead areas can be avoided according to the invention and thus measurements in the vicinity of the antenna are also made possible. With an overall cost-effective structure, measurements down to the floor of the container and into the corners of the container are possible.

Based on the system according to the invention, for the subsequent signal evaluation and data analysis relating to the presence recognition and calculation of the physical properties of the filling material, e.g. using a time-based impedance discontinuity detection, a large number of digital algorithms can then be used, including the use of AI (artificial intelligence) including machine learning, a sub-field of artificial intelligence in which the recognition of patterns in existing data sets enables a system to effect independent analyses and problem solutions, for calculation of the physical properties of the filling material for presence recognition.

The ultra-broadband antennas set up within the scope of the invention have a high dispersive/non-directional emission characteristic or have such field propagation properties. The electromagnetic field generated using the ultra-broadband signals is propagated in a spherical, at least hemispherical and thus volumetric manner into the measuring cell, in particular the container, i.e. similar to a capacitive proximity sensor, not directly in the direction of the filling material. Multiple reflections on metallic walls and built-in components can also occur here, which of course must also be taken into account accordingly.

The dipole structures proposed according to the invention instead of patch antennas can be made much more complex and, using a multilayer circuit board, can also extend in the direction of the measuring cell area, i.e. the filling level area to be detected by sensors. They can also be completely embedded in the carrier substrate, for example in a multilayer circuit board, which in particular can also be done using a vertical integration technique; an adapter which is used can also be embedded here.

LIST OF REFERENCE NUMERALS 100 filling level radar with focusing antennas
101 microwave electronics
102 focusing antenna
103 ground surface or reflector layer
104 high-frequency connection
200 measuring system according to the invention
201 ultra-broadband microwave unit
202 ultra-broadband antenna
203 high-frequency connection
204 adapter
205 carrier substrate
206 emitter element of the surface dipole
207 emitter element of a further surface dipole
209 protective layer
210 cavity
212 nth ultra-broadband antenna 300 container
301 container wall
400 measuring cell, especially in the form of an arbitrarily structured container
401 measuring cell wall, in particular formed by the container wall
402 shield
403 shielded area
500 filling material
501 filling material surface
502 dielectric body or substance
503 nth dielectric body or substance
504 surface of a body or substance
600 focused measurement field
601 directional beam
602 transmission signal
603 reception signal
700 volumetric measurement field
702 transmission signal
703 reception signal
704 reflected transmission signal
705 reflected reception signal

The invention claimed is:

1. A system for recognition and/or determination of the volume of bodies or substances made of dielectric and/or conductive material within an interior of a measuring cell, in the form of a container, with a conductive and/or non-conductive measuring cell wall that has a surface directed into the interior, comprising:
an ultra-broadband microwave unit, and
an ultra-broadband antenna having at least one disk-shaped carrier substrate which has a first surface facing a first side and a second surface which is opposed to the first surface and forms an outer side of the antenna, wherein the carrier substrate is arranged and intended to replace part of the surface of the measuring cell wall directed into the interior during operation, after fastening the ultra-broadband antenna to the measuring cell, or to extend in the interior at a distance in front of the measuring cell wall,
wherein the ultra-broadband antenna includes emitter elements arranged on or in the carrier substrate is set up as an electrically short antenna with an at least substantially hemispherical emission characteristic to cover a volumetric measurement field,
wherein adjacent to the carrier substrate and directed towards the first side at least one of a non-conductive and an absorber layer is arranged as a protective layer.

2. The system of claim 1, further comprising:
two planar emitter elements are arranged on or in the carrier substrate, which are held in a common plane, extending substantially parallel to the carrier substrate and together form a surface dipole, and
a high-frequency connection which is connected to the emitter elements and to which the ultra-broadband microwave unit is also connected, for the wired transmission of an ultra-broadband signal between the emitter elements and the ultra-broadband microwave unit.

3. The system according to claim 2, wherein horizontally and/or vertically parallel to the two planar emitter elements at least two further planar emitter elements are included, wherein in each case two of these at least two further planar emitter elements extending substantially parallel to the carrier substrate are held by this carrier substrate in each case in a common plane relative to each other, and together form a surface dipole.

4. The system according to claim 3, wherein a high-frequency connection for the wired transmission of an ultra-broadband signal between these emitter elements and the ultra-broadband microwave unit also connected to this high-frequency connection is connected to the two further emitter elements forming a surface dipole.

5. The system according to claim 1, wherein each of a high-frequency connection is connected via an adapter, for impedance conversion, to the emitter elements each forming a surface dipole.

6. The system according to claim 5, wherein the ultra-broadband antenna comprises a shield arranged at a distance from the carrier substrate and towards the first side when viewed from the carrier substrate and wherein the adapter is arranged between the shield and the carrier substrate.

7. The system according to claim 5, wherein a non-conductive and/or absorber layer adjacent to the carrier substrate and directed towards the first side is arranged as a protective layer and wherein the adapter is embedded in the protective layer.

8. The system according to claim 1, wherein the ultra-broadband antenna comprises a shield arranged at a distance from the carrier substrate and towards the first side when viewed from the carrier substrate.

9. The system according to claim 8, wherein the shield is not connected to the ultra-broadband microwave unit and/or wherein the shield is formed by the metallic measuring cell wall or a cover of the ultra-broadband antenna.

10. The system according to claim 1, wherein the ultra-broadband microwave unit is set up for the use of a continuously periodic signal as the ultra-broadband signal.

11. The system according to claim 1, wherein the ultra-broadband microwave unit comprises a transmission module for generating an ultra-broadband signal.

12. The system according to claim 1, wherein the ultra-broadband microwave unit comprises an evaluation module for evaluating a received ultra-broadband signal.

13. The system according to claim 1, further comprising at least a second ultra-broadband antenna, wherein the second ultra-broadband antenna is connected to at least one evaluation module for evaluating a received ultra-broadband signal.

14. The system according to claim 1, wherein the carrier substrate is a multi-layer circuit board and/or the emitter elements are embedded in the carrier substrate.

15. A system for recognition and/or determination of the volume of bodies or substances made of dielectric and/or conductive material within an interior of a measuring cell, in the form of a container, with a conductive and/or non-conductive measuring cell wall that has a surface directed into the interior, comprising:
an ultra-broadband microwave unit, and
an ultra-broadband antenna having at least one disk-shaped carrier substrate which has a first surface facing a first side and a second surface which is opposed to the first surface and forms an outer side of the antenna, wherein the carrier substrate is arranged and intended to replace part of the surface of the measuring cell wall directed into the interior during operation, after fastening the ultra-broadband antenna to the measuring cell, or to extend in the interior at a distance in front of the measuring cell wall,
wherein the ultra-broadband antenna includes two planar emitter elements arranged on or in the carrier substrate is set up as an electrically short antenna with an at least substantially hemispherical emission characteristic to cover a volumetric measurement field, and wherein the two planar emitter elements are held in a common plane, extending substantially parallel to the carrier substrate and together form a surface dipole, and a high-frequency connection is connected to the two planar emitter elements and to which the ultra-broadband microwave unit is also connected, for the wired transmission of an ultra-broadband signal between the emitter elements and the ultra-broadband microwave unit.

\* \* \* \* \*